H. T. YARYAN.
PROCESS FOR REMOVING TURPENTINE AND ROSIN FROM RESINOUS WOODS.
APPLICATION FILED AUG. 31, 1908.
915,400. Patented Mar. 16, 1909.
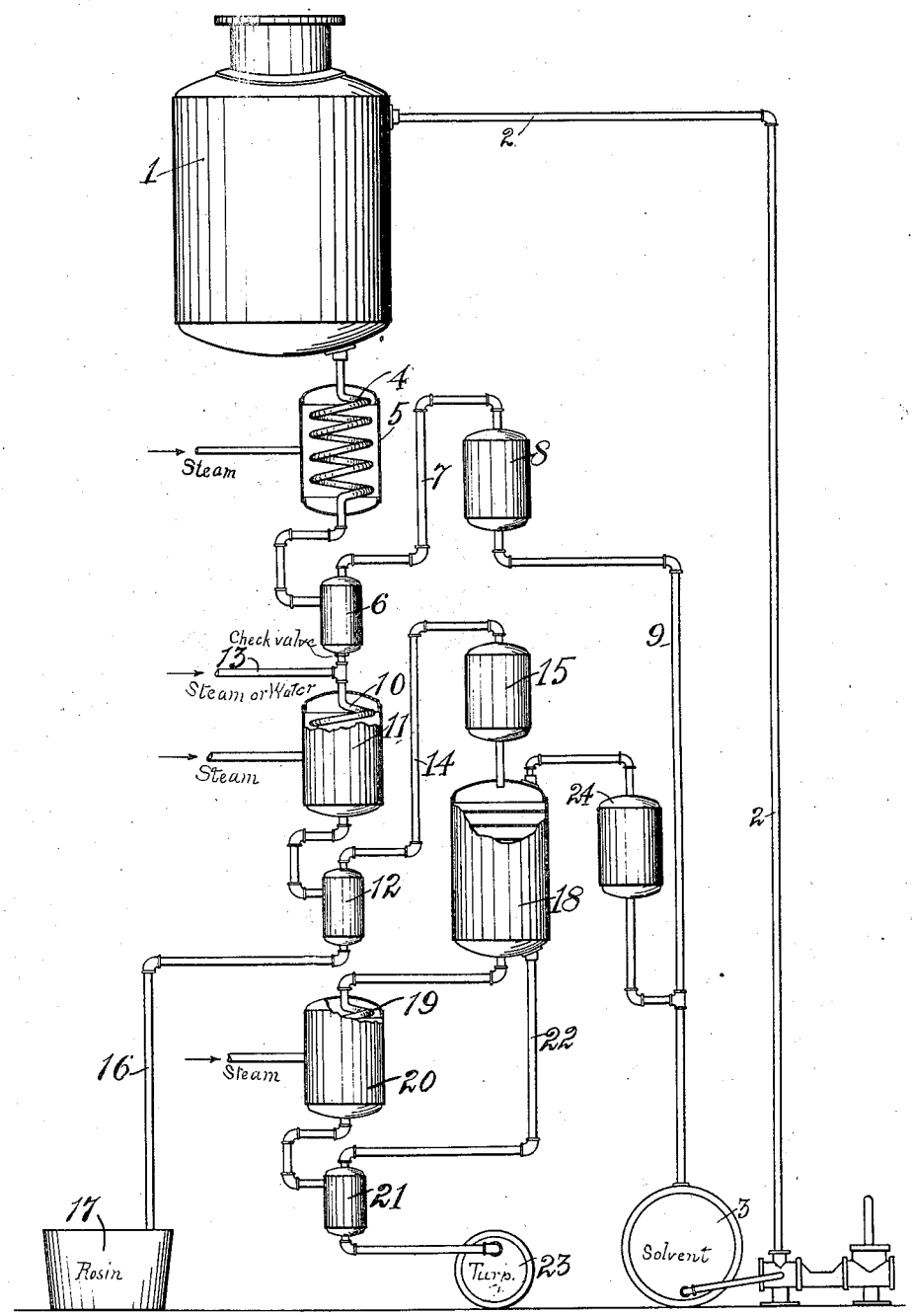

UNITED STATES PATENT OFFICE.

HOMER T. YARYAN, OF TOLEDO, OHIO.

PROCESS FOR REMOVING TURPENTINE AND ROSIN FROM RESINOUS WOODS.

No. 915,400.

Specification of Letters Patent.

Patented March 16, 1909.

Application filed August 31, 1908. Serial No. 451,013.

*To all whom it may concern:*

Be it known that I, HOMER T. YARYAN, a citizen of the United States, residing at Toledo, in the county of Lucas and State of Ohio, have invented certain new and useful Improvements in Processes for Removing Turpentine and Rosin from Resinous Woods; and I do declare the following to be a full, clear, and exact description of the invention, such as will enable others skilled in the art to which it appertains to make and use the same, reference being had to the accompanying drawings, and to the figures of reference marked thereon, which form a part of this specification.

In the process of extracting turpentine and rosin from resinous woods by means of a hydrocarbon solvent,—such as naphtha,—the recovery of the rosin from the solution, by distillation, is a comparatively simple matter, but the complete separation of all the turpentine from the solution presents difficulties which have heretofore prevented the adoption of such process on a commercial scale. This difficulty is due to the fact that in vaporizing and distilling a mixture of two or more volatile liquids having different boiling points, the lighter or more volatile vapors will carry over the heavier in increasing proportions as the boiling solution approaches the point of the complete separation of the lighter constituents. This renders necessary the further and repeated fractionation of the distillate, and as heretofore practiced, involves such expense and outlay of time and labor as to preclude the profitable use of the hydrocarbon process.

My invention is designed to overcome the difficulties here indicated, and to provide a process by means of which all the turpentine and rosin may be extracted from resinous woods, and by means of which the turpentine and rosin and solvent may be rapidly and economically separated and recovered.

I practice my process by means of the apparatus shown diagrammatically, by way of illustration, in the single figure of the accompanying drawing.

The process may most conveniently be described and understood by explaining the apparatus and its operation, which is as follows: The resinous wood to be treated is, in comminuted form, placed in the closed chamber of a stout iron tank or extractor 1. The wood is liberally sprayed or bathed with benzin, naphtha, petroleum or other suitable hydrocarbon introduced through pipe 2 from the hydrocarbon tank 3. The bath of hydrocarbon penetrates the woody particles and dissolves and washes out from the chips the turpentine and rosin. From the bottom of the extractor the solution is conducted through a coil 4 inclosed in a steam drum 5, which coil discharges into a separating chamber 6. The steam around the coil 4 is at such pressure and temperature as to heat the liquid flowing through the coil sufficiently to vaporize the hydrocarbon solvent, but not the turpentine,—say 240° F. When the liquid flows into the separating chamber 6, the liberated vapor escapes through pipe 7 into condenser 8 from whence it flows through pipe 9 back to the hydrocarbon tank 3 to be again used.

The unvaporized contents of the separating chamber 6 are conveyed through a second heating coil 10, inclosed in a steam drum 11, to a second separating chamber 12. The liquid in its course from the first separating chamber to the second is mixed with steam or water through pipe 13 to facilitate the vaporization of the turpentine and solvent. The steam in and surrounding the coil 10 is of such pressure and temperature,—say 280° F.,—as to vaporize the turpentine and solvent flowing therethrough. When the liquid from the coil 10 is discharged into the separating chamber 12 the liberated vapor flows through pipe 14 to condenser 15 leaving the rosin to be trapped off and condensed through pipe 16 to its receptacle 17.

Owing to the law governing the vaporizing of a mixture of two or more volatile liquids, above indicated, the turpentine has now carried with it from the separating chambers 6—12 to the condenser 15 a considerable percentage of the solvent. To effect the separation of this turpentine and solvent the solution is conducted from the condenser 15 into and through a rectifying column 18, of the usual or any preferred construction. The liquid flowing from the rectifying column is conducted through a heating coil 19 in steam drum 20 from whence the liquid is conducted to a third separating chamber 21. The steam surrounding the coil 19 is of such pressure and heat as to raise the temperature of the liquid flowing through the coil to, say, 306° or just below the boiling point of turpentine. When the liquid from the coil 19 is discharged into the separating chamber 21 the liberated vapor, principally solvent with some turpentine, passes through pipe 22 to the bottom of the chamber of the rectifying column while the unvaporized liquid,—turpentine,—is trapped off to the turpentine tank 23. The drip from the condenser 15 through the perforated floors of the column 18 is met at each floor by the ascending vapors from the separating chamber 21 and thus the ascending vapors have their heavier portions condensed while the more volatile vapors of the solvent continue to ascend. The dripping solution also has a portion of its solvent expelled in the form of vapor which ascends with the vapor coming from below, passing finally into condenser 24 from whence the solvent, now freed from its turpentine, passes to the tank 3. The dripping solution from which the solvent is thus rectified continues on through the coil 19 and separating chamber 21 to tank 23 giving up in its course, as vapor, the constituents having a lower boiling point than that fixed for the turpentine, these vapors being returned to the column 18 to be treated in turn as above described. Thus, it will be seen, the rosin, turpentine and solvent are completely separated and conveyed to their respective receptacles.

In the accompanying graphic illustration of my apparatus I have not shown the details of minor parts, such as valves, traps, dash-plates, pumps, and the like, as these will be understood by those skilled in the art, without further illustration. It will also be understood without illustration that a series of extractors may, if desired, be employed in connection with the remainder of the apparatus above described, in such manner that the process shall be practically continuous. It is also obvious that, if desired, the vaporization of the solutions may be facilitated by placing the liquids under a partial vacuum by means which are well understood.

Having described my invention, what I claim and desire to secure by Letters Patent is,—

1. The process of removing turpentine and rosin from resinous woods which consists, first, in treating the wood with a hydrocarbon solvent whereby the turpentine and rosin are removed in solution; second, by distilling from this solution the greater part of the solvent and then the turpentine with the remaining solvent, whereby the rosin is recovered, and, third, by passing the mixture of turpentine and solvent through a rectifying column, to separate and recover the turpentine and solvent.

2. The process of removing turpentine and rosin from resinous woods which consists in treating the woods with volatile hydrocarbon solvent, then passing the solution through a coiled evaporator to remove the greater portion of the solvent, then passing the remaining solution through a second coiled evaporator with steam by which the turpentine and the remainder of the solvent are removed and the rosin is recovered, and finally passing both the remaining solvent and turpentine through a rectifying column whereby the turpentine and solvent are separated and recovered.

3. The process of removing turpentine and rosin from resinous woods which consists in treating the woods with a volatile hydrocarbon solvent, then distilling the solution thus obtained to recover the greater portion of the solvent, then distilling the remainder of the solution to separate and recover the rosin, then passing the remaining solution through a rectifying column, then distilling the liquid discharged from the rectifying column to recover the turpentine, then returning the vapors from the last mentioned distillation to the rectifying column, and then conducting the uncondensed portion of said vapors to a condenser to recover the solvent.

4. The process of removing turpentine and rosin from resinous woods which consists in treating the woods with a volatile hydrocarbon solvent, then passing the solution thus obtained through a heating coil into a separating chamber, then conducting the liberated vapors from such separating chamber through a condenser to a receptacle for the solvent, then conducting the remaining solution through a heating coil into a second separating chamber, then conducting the liberated vapors from said second separating chamber to a second condenser to separate and recover the rosin, then conducting the remaining solution from said second condenser through a rectifying column and through a third heating coil into a third separating chamber, then removing the unvaporized liquid from said third separating chamber whereby the turpentine is recovered, then conveying the liberated vapors from said third separating chamber back to the rectifying column, and then conveying the uncondensed vapors from the rectifying column to a condenser, whereby the remaining solvent is recovered.

5. The process of removing turpentine and rosin from resinous woods which consists in treating the woods with a volatile hydrocarbon solvent, then passing the solution thus obtained through a heating coil into a separating chamber, then conducting the liberated vapors from such separating chamber through a condenser to a receptacle for the solvent; then conducting the remaining solution mingled with added steam through a heating coil into a second separating chamber, then conducting the liberated vapors from said second separating chamber to a second condenser to separate and recover the rosin, then conducting the remaining solution from said second condenser through a rectifying column and through a third heating coil into a third separating chamber, then removing the unvaporized liquid from said third separating chamber whereby the turpentine is recovered, then conveying the liberated vapors from said third separating chamber back to the rectifying column, and then conveying the uncondensed vapors from the rectifying column to a condenser, whereby the remaining solvent is recovered.

In testimony whereof I affix my signature in presence of two witnesses.

HOMER T. YARYAN.

Witnesses:
   CLAYTON MURPHY,
   ADA E. CAMERON.